US011232077B2

(12) United States Patent
Lee et al.

(10) Patent No.: US 11,232,077 B2
(45) Date of Patent: Jan. 25, 2022

(54) METHOD AND APPARATUS FOR SHARING INFORMATION RECORDED ON BLOCKCHAIN BASED ON ANCHORING

(71) Applicant: SAMSUNG SDS CO., LTD., Seoul (KR)

(72) Inventors: Jae Seok Lee, Seoul (KR); Hyo Jung Lee, Seoul (KR); Jung Woo Cho, Seoul (KR); Ki Woon Sung, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 56 days.

(21) Appl. No.: 16/664,381

(22) Filed: Oct. 25, 2019

(65) Prior Publication Data
US 2020/0133921 A1 Apr. 30, 2020

(30) Foreign Application Priority Data
Oct. 26, 2018 (KR) .......................... 10-2018-0128802

(51) Int. Cl.
| G06F 16/176 | (2019.01) |
| G06F 16/182 | (2019.01) |
| G06Q 20/38 | (2012.01) |
| H04L 9/06 | (2006.01) |

(52) U.S. Cl.
CPC ........ *G06F 16/176* (2019.01); *G06F 16/1837* (2019.01); *G06Q 20/3825* (2013.01); *G06Q 20/3827* (2013.01); *G06Q 20/3829* (2013.01); *H04L 9/0637* (2013.01)

(58) Field of Classification Search
USPC ....................................................... 713/168
See application file for complete search history.

(56) References Cited

U.S. PATENT DOCUMENTS

| 2016/0191243 A1* | 6/2016 | Manning ................. H04L 9/321 713/168 |
| 2018/0285839 A1* | 10/2018 | Yang ..................... H04L 9/3239 |
| 2019/0018888 A1* | 1/2019 | Madisetti .............. H04L 9/3297 |

FOREIGN PATENT DOCUMENTS

| CN | 108038184 A | 5/2018 |
| KR | 10-2018-0029695 A | 3/2018 |

OTHER PUBLICATIONS

European Search Report For EP19205305.6 dated Dec. 17, 2019 from European patent office in a counterpart European patent application.
Edoardo Gaeiani et al., "Blockchain-Based Database To Ensure Data Integrity In Cloud Computing Environments", Proceedings of the First Italian Conference on Cybersecurity (ITASEC17), Venice, Italy, pp. 146-155, 2017.
Aniello Leonard et al., "A Prototype Evaluation of a Tamper-Resistant High Performance Blockchain-Based Transaction Log for a Distributed Database", 2017 13th European Dependable Computing Conference (EDCC), IEEE, pp. 151-154, 2017.

\* cited by examiner

*Primary Examiner* — Sakinah White Taylor
(74) *Attorney, Agent, or Firm* — The PL Law Group, PLLC

(57) ABSTRACT

A method of sharing information on the basis of anchoring and an anchoring device supporting the same and more particularly are provided. One of the methods includes, acquiring anchoring information including first field information permitted for sharing from a target transaction record recorded in a first blockchain and recording the acquired anchoring information in a second blockchain.

16 Claims, 14 Drawing Sheets

METHOD AND APPARATUS FOR SHARING INFORMATION RECORDED ON BLOCKCHAIN BASED ON ANCHORING

CROSS-REFERENCE TO RELATED APPLICATION

This application claims priority from Korean Patent Application No. 10-2018-0128802 filed on Oct. 26, 2018 in the Korean Intellectual Property Office, the disclosure of which is incorporated herein by reference in its entirety.

BACKGROUND

1. Field of the Disclosure

The present disclosure relates to a method of sharing information on the basis of anchoring and an anchoring device supporting the same and more particularly, to a method of selectively sharing data recorded in a blockchain through anchoring and an anchoring device supporting the method.

2. Description of the Related Art

Blockchain refers to a data management technology for recording continuously-increasing data in specific unit blocks and managing the blocks in a chain-form data structure through blockchain nodes constituting a peer-to-peer (P2P) network or data configured in the chain-form data structure. A blockchain configured in the chain-form data structure is managed in the form of a distributed ledger at each node without a central system.

Each blockchain node constituting a blockchain network manages blocks in a chain form as shown in FIG. 1. In each block, a hash value of a previous block is recorded so that the previous block may be referred to by the hash value. Therefore, as the number of blocks increases, it becomes difficult to forge data recorded in the blocks, and the reliability of data is improved. Also, even in a distributed environment, the integrity of data is ensured.

Meanwhile, since all data recorded in a blockchain is identically stored in all blockchain nodes, it is not easy for a sharer to selectively share only specific information with a specific sharee in a general blockchain environment. When a sharer and a sharee constitute a private blockchain network, it is only possible to restrict access of other users, and it is not possible to selectively share information with the sharee.

It is possible to consider a method of constituting a private blockchain network excluding the sharee and separately constituting a public blockchain network. In other words, to selectively share information with the sharee, it is possible to upload only specific information among pieces of information recorded in the private blockchain to the public blockchain. In this case, however, the sharee cannot make sure that information shared through the public blockchain is identical to information recorded in the private blockchain, and thus the reliability (or integrity) of information cannot be ensured.

Consequently, a method is necessary to selectively share information through a blockchain and also ensure the integrity of information to be shared.

SUMMARY

Aspects of the present disclosure provide a method of selectively sharing data recorded in a blockchain by using an anchoring technique and an anchoring device supporting the method.

Aspects of the present disclosure also provide a method of selectively sharing information recorded in a blockchain and also ensuring the integrity of information to be shared and an anchoring device supporting the method.

It should be noted that objects of the present invention are not limited to the above-described objects, and other objects of the present invention will be apparent to those skilled in the art from the following descriptions.

According to the present disclosure, a method performed by an anchoring device to share information on the basis of anchoring is provided. The method comprises acquiring anchoring information including first field information permitted for sharing from a target transaction record recorded in a first blockchain and recording the acquired anchoring information in a second blockchain.

According to the present disclosure, a method performed by a computing device to share information on the basis of anchoring is provided. The method comprises retrieving an anchoring transaction record recorded in a first blockchain, the anchoring transaction record including first field information and second field information for verifying the first field information and verifying the first field information by using the second field information. The anchoring transaction record may be generated by anchoring a target transaction record recorded in a second blockchain. The first field information may be field information permitted for sharing in the target transaction record.

According to the present disclosure, an anchoring device is provided. The device comprises a communication interface configured to interoperate with a first blockchain and a second blockchain, a memory including one or more instructions, and a processor configured to, by executing the one or more instructions, acquire anchoring information including first field information permitted for sharing from a target transaction record recorded in the first blockchain and record the acquired anchoring information in the second blockchain.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
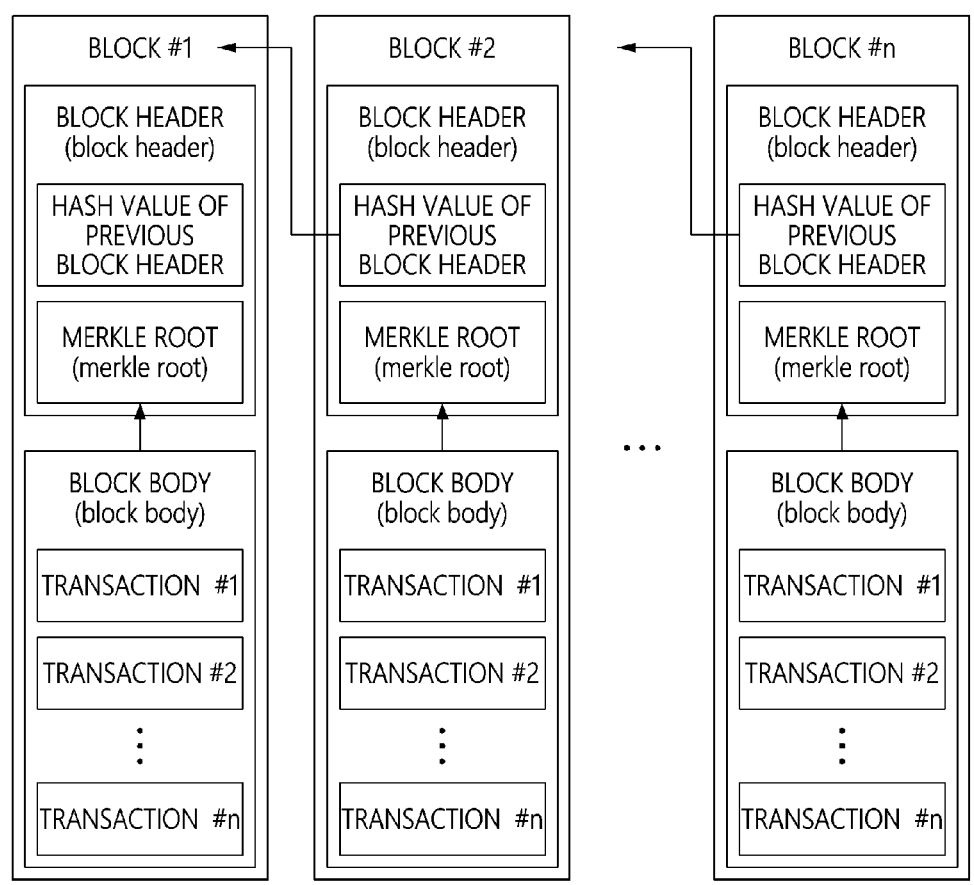
FIG. 1 is a block diagram showing an exemplary data structure of a blockchain which may be referred to in some exemplary embodiments of the present disclosure.

The present invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The same reference numbers indicate the same components throughout the specification.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Before description of this specification, some terms used herein will be clarified.

In this specification, a blockchain or blockchain data indicates data maintained by each blockchain node constituting a blockchain network, and at least one block of the data is configured in a chain-form data structure. In a blockchain-based system, all blockchain nodes share the same blockchain data. However, in a blockchain-based system supporting a multi-channel function (e.g., Hyperledger Fabric), only blockchain nodes belonging to the same channel share the same blockchain data.

In this specification, a blockchain network is a network having a peer-to-peer (P2P) structure composed of a plurality of blockchain nodes which operate according to a blockchain algorithm (or protocol).

In this specification, a blockchain node is a computing node which constitutes a blockchain network and operates according to a blockchain algorithm (or protocol). The computing node may be implemented as a physical device or a logical device, such as a virtual machine. When the computing node is implemented as a virtual machine, a plurality of blockchain nodes may be included in one physical device.

In this specification, a transaction or blockchain transaction may denote all actions which cause a state change (e.g., an increase or decrease in the balance or a transfer of asset) in a blockchain environment, all actions of retrieving state data recorded in a blockchain, or data indicating the actions. For example, the transaction may encompass an action of writing specific data in a blockchain, an action of reading specific data recorded in a blockchain, and the like. The transaction may be classified into a writing type (e.g., transactions for adding, modifying, deleting, etc. state data) and a reading type (e.g., a transaction for retrieving state data). In addition to the reading and writing types, various types (e.g., execution) of transactions may be present depending on a blockchain platform. In this case, the transaction may encompass all of the various types of transactions. In the corresponding technical field, the transaction may be used together with the term "query" and the like of the reading type of transaction. The transaction may be executed through a smart contract (e.g., accessing a blockchain through a function and variable defined in the smart contract), but this may vary according to implementation forms.

In this specification, a smart contract denotes a script or software code used for transaction processing in a blockchain-based system. More specifically, the smart contract is code which is written by programming various conditions used for transaction processing, states, and actions resulting from the conditions. For example, the smart contract may include smart contract of Ethereum, chain code of Hyperledger Fabric, and the like. In a blockchain-based system, blockchain nodes may share a smart contract through a blockchain.

In this specification, a transaction record denotes transaction data recorded in a unit block constituting a blockchain. The transaction record may have at least one field. The field is a logical information unit having a meaning and may be used together with the terms "attribute," "element," "item," etc. in the technical field.

In this specification, an instruction is a series of commands grouped by function and indicates an element of a computer program executed by a processor.

Hereinafter, various exemplary embodiments of the present disclosure will be described in detail with reference to the accompanying drawings.

Figure 2:
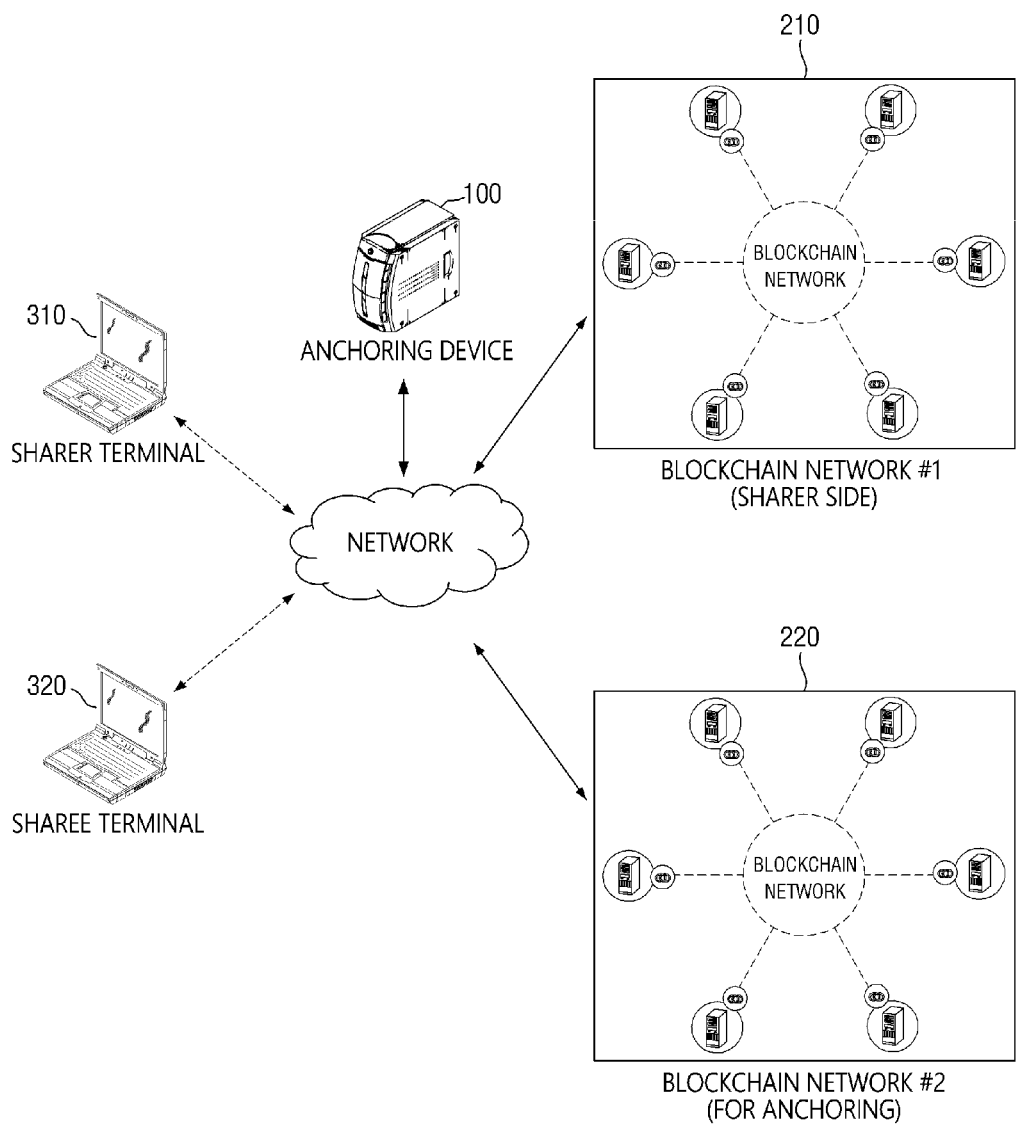
FIG. 2 is a diagram showing an exemplary configuration of an anchoring-based information sharing system according to an exemplary embodiment of the present disclosure.

FIG. 2 is a diagram showing an exemplary configuration of an anchoring-based information sharing system according to an exemplary embodiment of the present disclosure.

As shown in FIG. 2, the information sharing system may include an anchoring device 100, a sharer terminal 310, a sharee terminal 320, and a plurality of blockchain networks 210 and 220. However, this is merely an exemplary embodiment for achieving the objects of the present disclosure, and some elements may be added or removed as necessary. Each element of the information sharing system shown in FIG. 2 shows functional elements which are functionally distinguished, and a plurality of elements may be implemented in an integrated form in an actual physical environment. For example, the sharer terminal 310, the anchoring device 100, and/or one or more blockchain nodes constituting the first blockchain network 210 may be implemented in the form of different logics in the same physical computing device.

Also, in an actual physical environment, each of the elements may be implemented in the form of a plurality of subdivided functional elements. For example, a first function of the anchoring device 100 may be implemented in a first computing device, and a second function may be implemented in a second computing device. Each of the elements shown in FIG. 2 will be described below.

Figure 14:
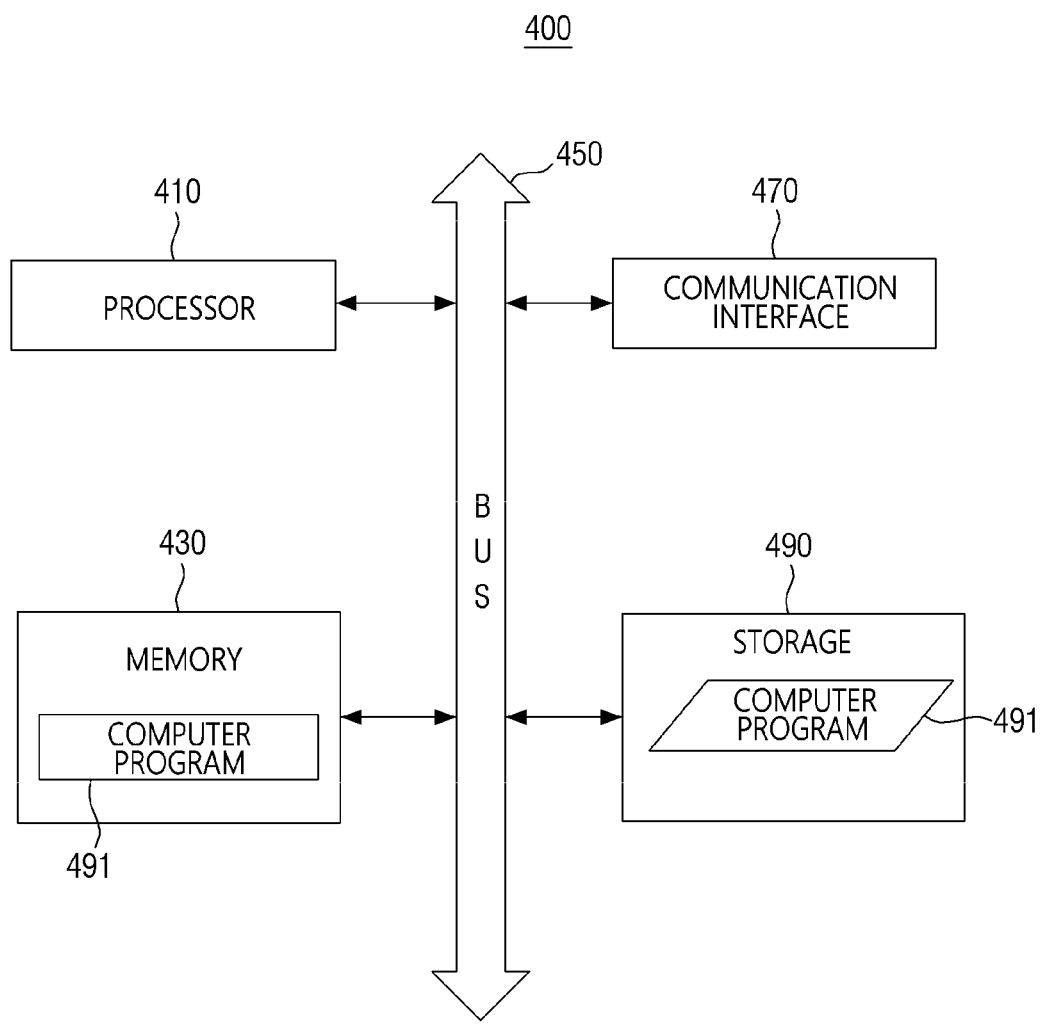
FIG. 14 is a block diagram showing a hardware configuration of an exemplary computing device for implementing a device according to various exemplary embodiments of the present disclosure.

In the information sharing system, the anchoring device 100 is a computing device which provides an information sharing function between a sharer and a sharee. The computing device may be a notebook, a desktop, a laptop, and the like. However, the computing device is not limited thereto and may include any type of device having a computing function and a communication function. An example of the computing device is shown in FIG. 14.

For convenience of understanding, the concept of anchoring will be briefly described with reference to FIG. 3.

Figure 3:
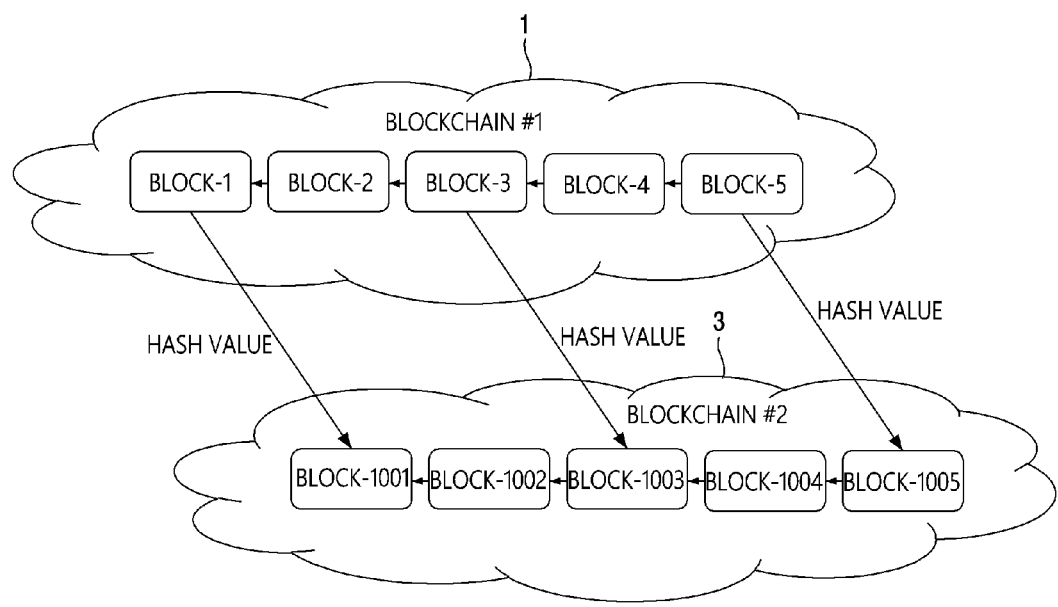
FIG. 3 is a diagram illustrating the concept of anchoring which may be referred to in some exemplary embodiments of the present disclosure.

As shown in FIG. 3, anchoring is a technique for recording certain evidential information in another blockchain 3 in order to prevent manipulation of a transaction record (or data) recorded in a specific blockchain 1. As an example, the evidential information may be a hash value related to the transaction record.

For example, when a transaction record recorded in a private blockchain is anchored to a public blockchain, it is possible not only to ensure the security of information through the private blockchain but also to ensure the integrity of information through the public blockchain.

The private blockchain refers to a blockchain shared through a private blockchain network, and the public blockchain refers to a blockchain shared through a public blockchain network. Likewise, unless mentioned otherwise below, a first blockchain is assumed to refer to a blockchain shared through a first blockchain network (e.g., 210), and a second blockchain is assumed to refer to a blockchain shared through a second blockchain network (e.g., 220). Referring back to FIG. 2, the description will be continued.

According to an exemplary embodiment of the present disclosure, the anchoring device 100 may provide a selective (or limitative) information sharing function through anchoring. For example, it is assumed that a specific transaction record recorded in the first blockchain includes a plurality of pieces of field information, some of the field information is information permitted for sharing (hereinafter "shared information"), and other field information is information not permitted for sharing (hereinafter "unshared information"). In this case, the anchoring device 100 may anchor evidential information (e.g., a transaction identifier (TxID), a block number, and a block hash), and the shared information to the second blockchain. In this way, it is possible to share only the shared information with a sharee excluding the unshared information. This exemplary embodiment will be described in detail below with reference to FIG. 6.

According to an exemplary embodiment of the present disclosure, an electronic signature of the shared information may be anchored to the second blockchain together. In this way, the reliability of the shared information may be ensured. This exemplary embodiment will be described in detail below with reference to FIGS. 7 and 8.

According to an exemplary embodiment of the present disclosure, a hash value of a Merkle tree may be anchored to the second blockchain together with the shared information. In this way, the reliability of the shared information may be verified. The Merkle tree is a tree configured on the basis of a plurality of pieces of field information included in the specific transaction record. This exemplary embodiment will be described in detail below with reference to FIGS. 9 to 12.

In the information sharing system, the sharer terminal 310 is a computing device of a sharer who shares information.

The sharer terminal 310 may generate a transaction for recording specific information in the first blockchain and execute the transaction through the first blockchain network 210. Also, a transaction record of the specific information may be recorded in the first blockchain as an execution result of the transaction. As described above, shared information in the transaction record may be recorded in the second blockchain through anchoring.

In the information sharing system, the sharee terminal 320 is a computing device of a sharee who receives shared information from the sharer. The sharee terminal 320 may generate a transaction for retrieval and execute the transaction through the second blockchain network 220. In this way, the sharee terminal 320 may acquire the shared information recorded in the second blockchain through anchoring. The sharee terminal 320 will be described in further detail below with reference to FIG. 6 and the following drawings.

In the information sharing system, the first blockchain network 210 is a blockchain network on the sharer's side and manages the first blockchain. Also, the second blockchain network 220 is a blockchain network for anchoring and manages the second blockchain in which anchoring information is recorded.

To selectively share information, the first blockchain is implemented to restrict access of sharees, and the second blockchain is implemented to allow access of sharees.

In an exemplary embodiment, the first blockchain may be implemented as a private blockchain to which access of the sharee is restricted, and the second blockchain may be implemented as a public blockchain.

In another exemplary embodiment, the first blockchain may be implemented as a private blockchain to which access of the sharee is restricted, and the second blockchain may be implemented as a private blockchain to which access of the sharee is allowed.

Meanwhile, the first blockchain network 210 and the second blockchain network 220 are not required to be implemented independently from each other. For example, in the case of a blockchain platform which provides a multi-channel function (e.g., Hyperledger Fabric), the first blockchain network 210 and the second blockchain network 220 may be implemented to correspond to a specific channel. Such a channel configuration will be additionally described below with reference to FIG. 5.

At least some elements of the information sharing system shown in FIG. 2 may communicate with each other through a network The network may be implemented as any type of wired or wireless network, such as a local area network (LAN), a wide area network (WAN), a mobile radio communication network, and a wireless broadband Internet (WiBro).

Thus far, the anchoring-based information sharing system according to an exemplary embodiment of the present disclosure has been described with reference to FIGS. 2 and 3. An anchoring-based information sharing system according to another exemplary embodiment of the present disclosure will be described below.

Figure 4:
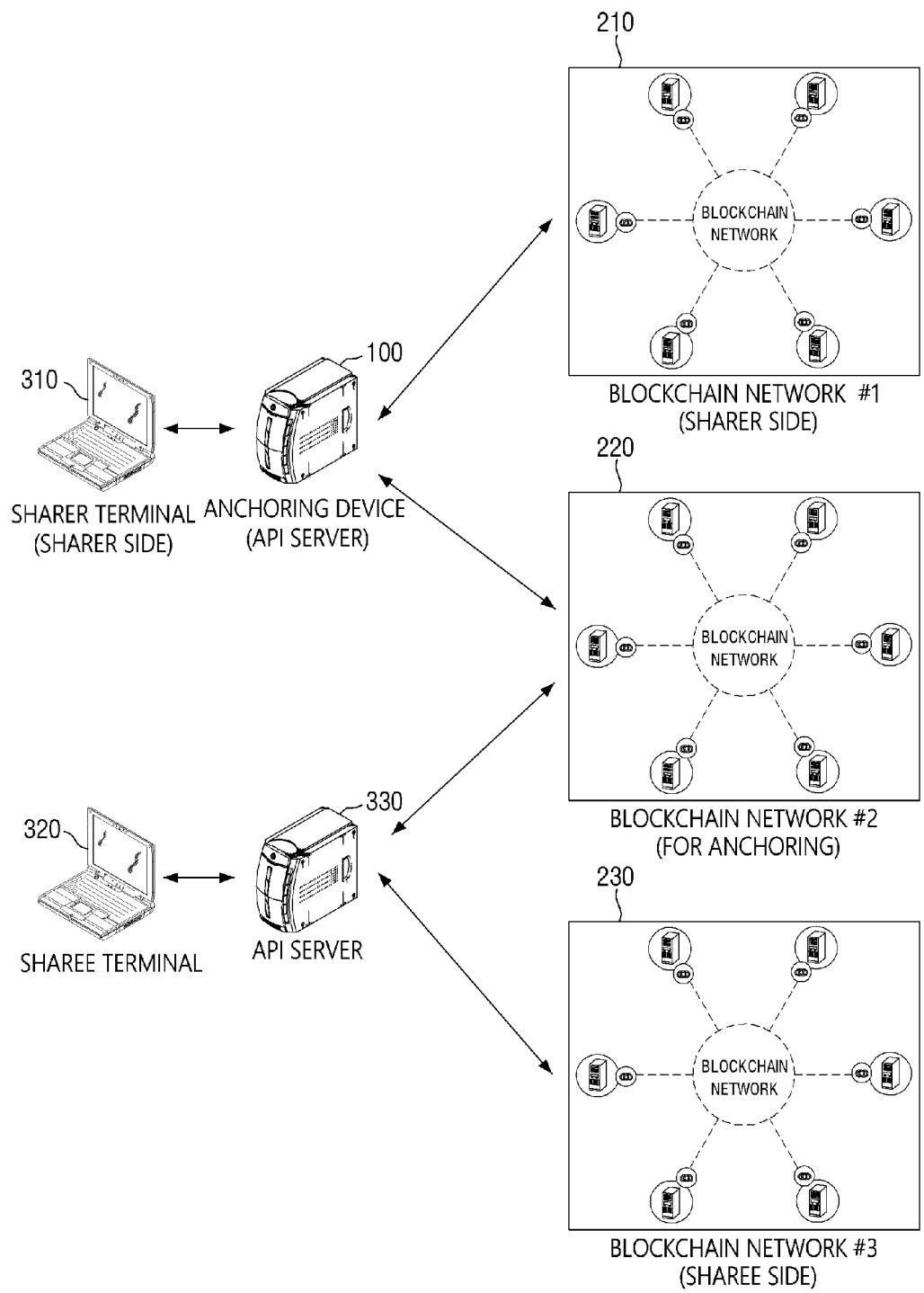
FIG. 4 is a diagram showing an exemplary configuration of an anchoring-based information sharing system according to another exemplary embodiment of the present disclosure.

FIG. 4 is a diagram showing an exemplary configuration of an anchoring-based information sharing system according to another exemplary embodiment of the present disclosure. For clarity of this specification, description of the same elements as those of the above embodiment will be omitted.

As shown in FIG. 4, the anchoring-based information sharing system may further include a third blockchain network 230.

The third blockchain network 230 is a blockchain network on a sharee's side and may manage a third blockchain. The third blockchain network 230 may be implemented as a private blockchain network or a public blockchain network.

As shown in FIG. 4, an anchoring function according to an exemplary embodiment of the present disclosure may be implemented in an application programming interface (API) server on a sharer's side. In other words, an anchoring device 100 may operate as an API server and process a transaction requested by a sharer terminal 310 in conjunction with the first blockchain network 210. Also, the anchoring device 100 may process an anchoring transaction in conjunction with the second blockchain network 220. The anchoring transaction is a transaction for recording anchoring information in a second blockchain.

However, according to another exemplary embodiment of the present disclosure, the anchoring function may be implemented in a specific blockchain node rather than an API server or implemented in another device.

An API server 330 may process a transaction requested by a sharee terminal 320 in conjunction with the second blockchain network 220 and/or the third blockchain network 230. For example, the API server 330 may execute a retrieval transaction requested by the sharee terminal 320 and provide information anchored to the second blockchain to the sharee terminal 320.

Figure 5:
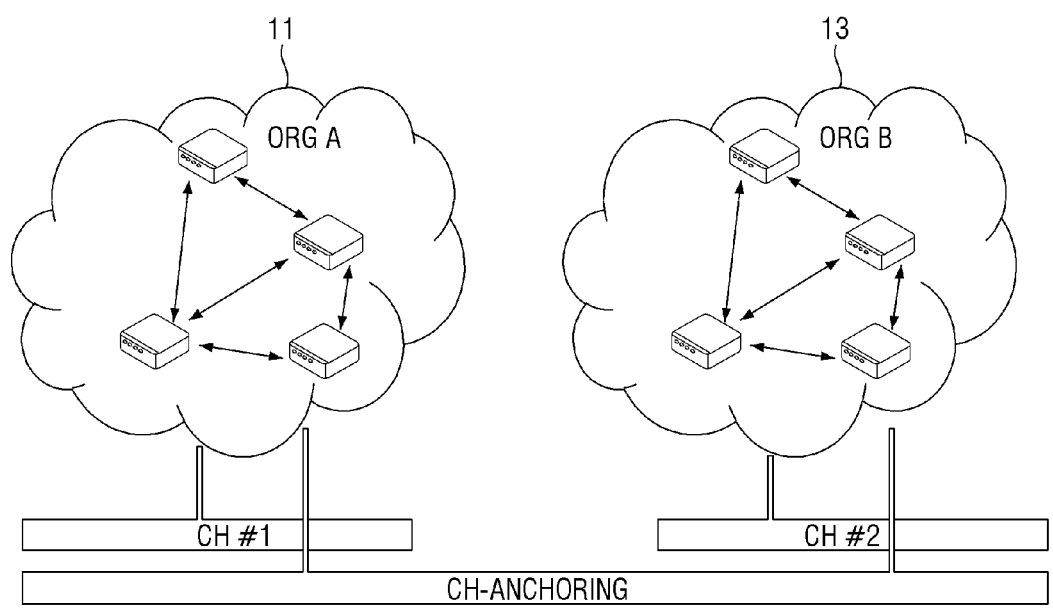
FIG. 5 is a diagram illustrating an example of a blockchain network for anchoring configured in a multi-channel environment according to an exemplary embodiment of the present disclosure.

Meanwhile, according to some exemplary embodiments of the present disclosure, at least some of the first to third blockchain networks 210 to 230 may be implemented to correspond to different channels in one blockchain network. For example, as shown in FIG. 5, the first blockchain network 210 may be implemented to correspond to a first channel composed of a first blockchain node group 11, and the third blockchain network 230 may be implemented to correspond to a second channel composed of a second blockchain node group 13. Also, the second blockchain network 220 may be implemented to correspond to a channel for anchoring including the first and second blockchain node groups 11 and 13. In this case, the sharer may selectively share specific information with the sharee through a blockchain shared in the anchoring channel.

Thus far, the anchoring-based information sharing system according to another exemplary embodiment of the present disclosure has been described with reference to FIGS. 4 and 5. An anchoring-based information sharing method according to another exemplary embodiment of the present disclosure will be described below.

Each operation of an anchoring-based information sharing method to be described below may be performed by a computing device. In other words, each operation of the information sharing method may be implemented as one or more instructions executed by a processor of the computing device. Assuming that the information sharing method is performed by the system shown in FIG. 4, the information sharing method will be continuously described below.

Figure 6:
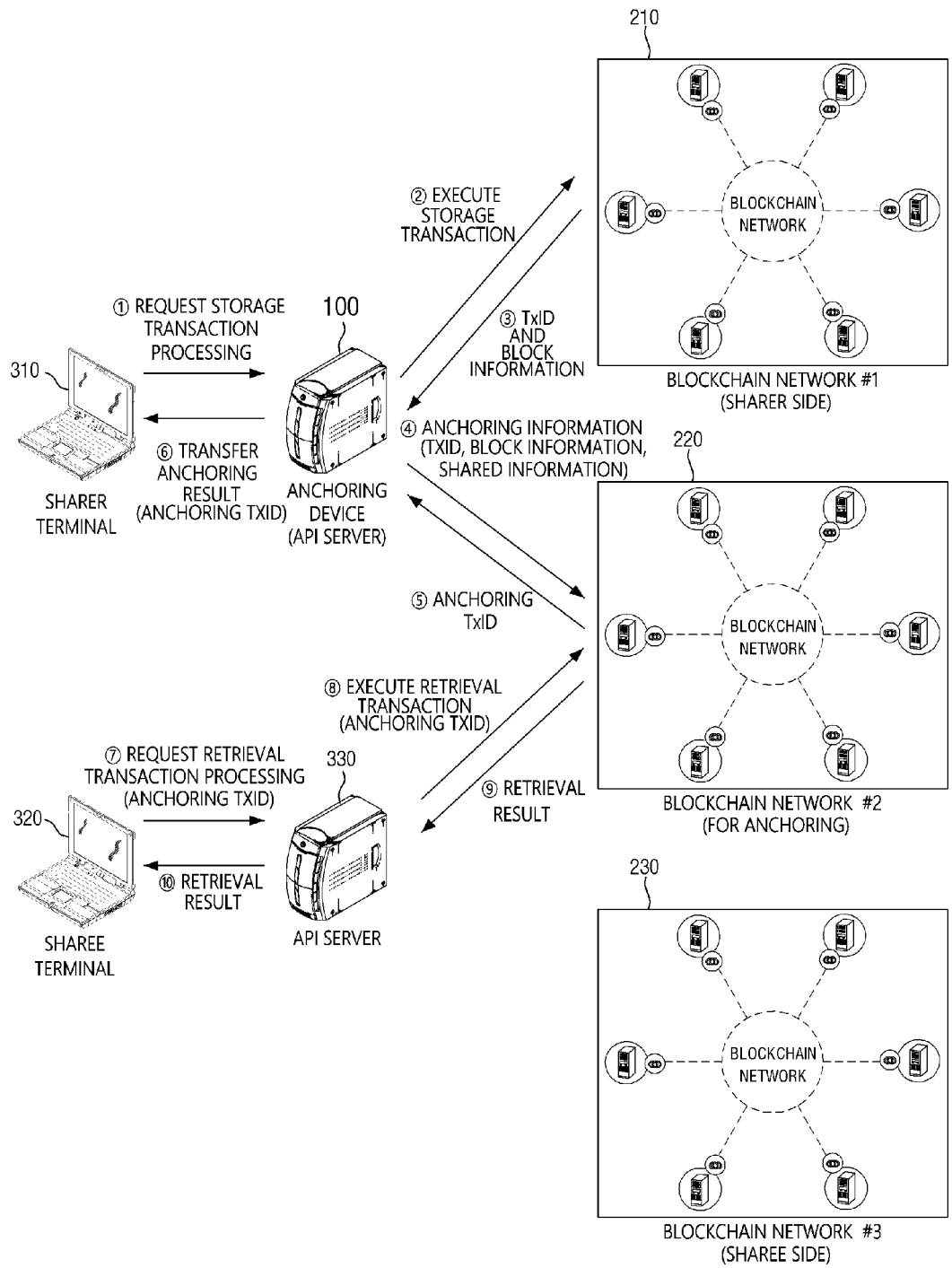
FIG. 6 is a diagram showing an exemplary flow of an anchoring-based information sharing method according to an exemplary embodiment of the present disclosure.

FIG. 6 is a diagram showing an exemplary flow of an anchoring-based information sharing method according to an exemplary embodiment of the present disclosure. However, this is merely an exemplary embodiment for achieving the objects of the present disclosure, and some operations may be added or removed as necessary.

As shown in FIG. 6, the information sharing method begins with operation 1 in which the sharer terminal 310 requests storage transaction processing of specific information.

Subsequently, the anchoring device 100 executes the storage transaction in conjunction with the first blockchain network 210 (2). Accordingly, the specific information may be recorded in a transaction record of the first blockchain.

Also, the anchoring device 100 may acquire a TxID and information of a block in which the specific information is recorded as execution results of the storage transaction (3). The block information may include, for example, a block number, a hash value of the block, and the like.

Subsequently, the anchoring device 100 generates anchoring information and executes an anchoring transaction in conjunction with the second blockchain network 220 (4). As the anchoring transaction is executed, an anchoring transaction record containing the anchoring information may be recorded in the second blockchain.

The anchoring information may include shared information and verification information. As described above, the shared information is information permitted for sharing among transaction records recorded in the first blockchain. Whether to permit sharing may be determined by the sharer terminal 310 or determined by the anchoring device 100 according to preset rules. In other words, a method and/or subject for selecting the shared information may vary according to embodiments without limit.

The verification information may include first verification information for ensuring the reliability (or integrity) of a transaction record and second verification information for ensuring the reliability (or integrity) of shared information. The first verification information may include, for example, a TxID, block information (e.g., a block number and a hash value of the block), and the like.

The second verification information may vary according to embodiments.

In a first exemplary embodiment, the second verification information may be electronic signature information of the shared information. The first exemplary embodiment will be described in detail with reference to FIGS. 7 and 8.

In a second exemplary embodiment, the second verification information may be a hash value related to unshared information among hash values constituting a Merkle tree. The second exemplary embodiment will be described in detail below with reference to FIGS. 9 to 12.

Subsequently, the anchoring device 100 may acquire an anchoring TxID, block information, etc. as execution results of the anchoring transaction (5). The acquired information may be used to retrieve anchoring information from the second blockchain.

Subsequently, the anchoring device 100 transfers the anchoring TxID, the block information, etc. to the sharer terminal 310 (6).

When anchoring is performed through the above process, the sharer terminal 310 may share the shared information with the sharee terminal 320 through the second blockchain. Specifically, the sharer terminal 310 may provide the anchoring TxID, block information of the anchoring transaction record, etc. to the sharee terminal 320. Then, the sharee terminal 320 may retrieve shared information from the second blockchain using the provided anchoring TxID and the like (7, 8, 9, and 10). For example, the sharee terminal 320 may retrieve shared information included in the anchoring transaction record by executing a retrieval transaction for retrieving the anchoring transaction record through the API server 330.

Thus far, a process of selectively sharing information through anchoring has been described with reference to FIG. 6. According to the above description, it is possible to selectively share only information wanted by a sharer with a sharee through anchoring even in a blockchain environment. This technical spirit ("selectively sharing information through anchoring") of the present disclosure may be used in various fields. As a representative application example, the technical spirit of the present disclosure embodied in the supply chain management (SCM) field will be described below with reference to FIG. 13.

Some exemplary embodiments of the present disclosure for ensuring the reliability and integrity of shared information will be described below with reference to FIGS. 7 to 12.

Figure 7:
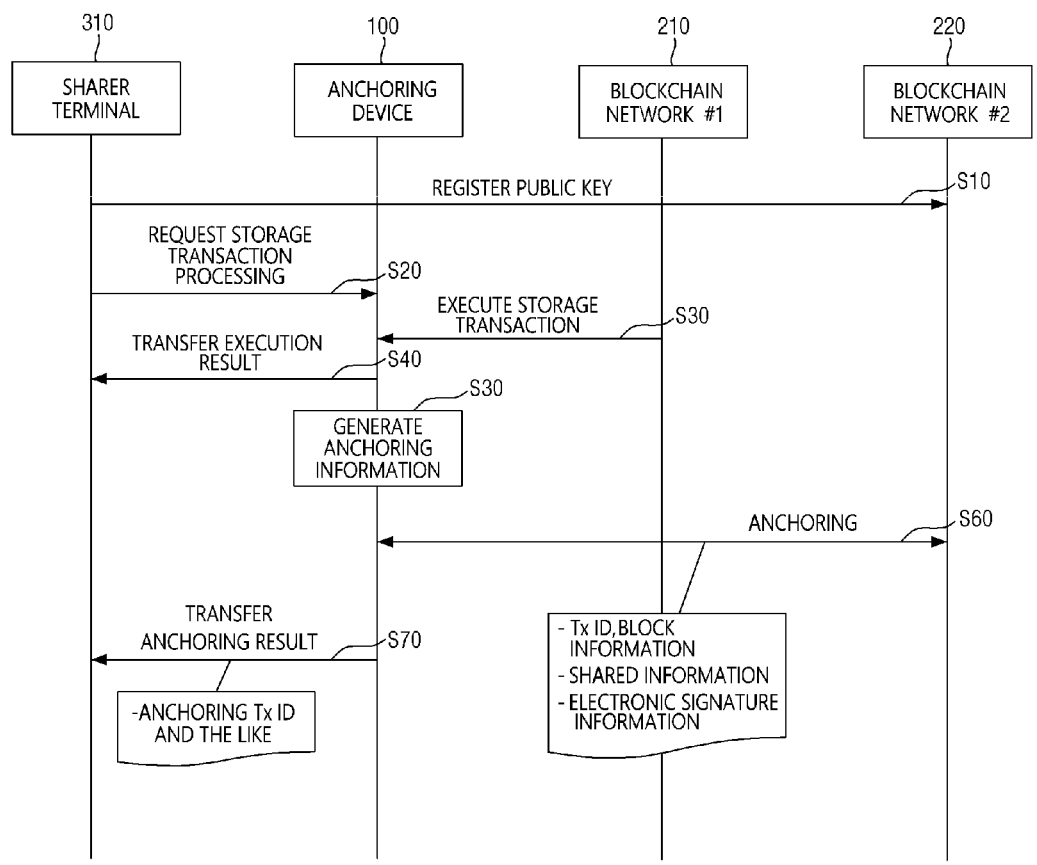
FIGS. 7 and 8 are exemplary sequence diagrams showing a method of sharing and verifying information on the basis of anchoring according to a first exemplary embodiment of the present disclosure.
Figure 8:
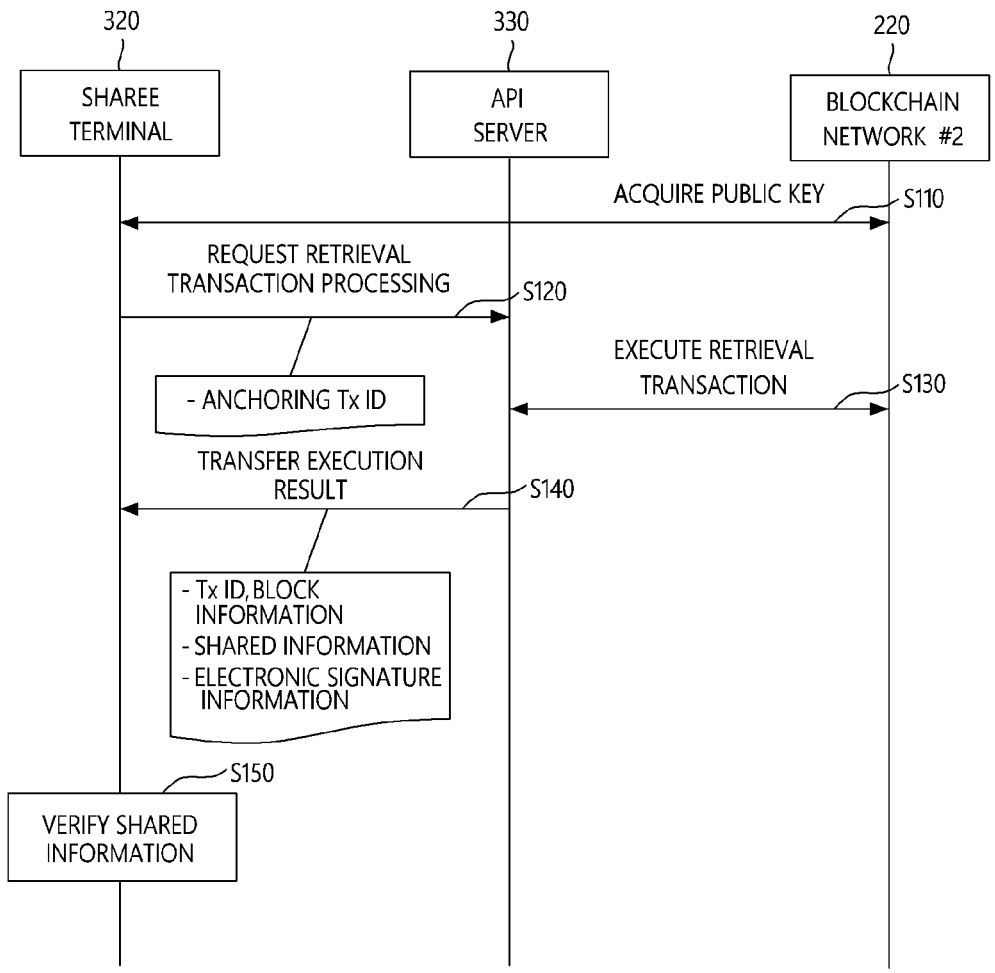

FIGS. 7 and 8 are exemplary sequence diagrams showing a method of sharing and verifying information on the basis of anchoring according to a first exemplary embodiment of the present disclosure.

The first exemplary embodiment relates to a method of utilizing electronic signature information as verification information. FIG. 7 will be described first.

As shown in FIG. 7, the first exemplary embodiment begins with operation S10 in which the sharer terminal 310 registers a public key of a sharer in the second blockchain network 220. FIG. 7 shows that the public key is registered in the blockchain network for anchoring 220 by way of example. However, since this operation S10 is performed to ensure the reliability of the public key, the public key may be registered in another public blockchain network or another server according to another exemplary embodiment of the present disclosure.

In operations S20 to S40, a transaction record of specific information is recorded in a first blockchain shared in the first blockchain network 210. These operations S20 to S40 are the same as described above with reference to FIG. 6, and thus further description will be omitted.

In operation S50, the anchoring device 100 generates anchoring information. At this time, the anchoring information may include not only shared information but also electronic signature information of the shared information. Also, the anchoring information may further include a TxID, block information, etc. of the transaction record.

The electronic signature information is information generated with a private key of the sharer. Therefore, a sharee may trust the shared information by verifying the electronic signature information.

In operation S60, the anchoring device 100 performs anchoring for recording the anchoring information in the second blockchain in conjunction with the second blockchain network 220.

In operation S70, the anchoring device 100 provides anchoring results to the sharer terminal 310. The anchoring results may include the ID of the anchoring transaction, the block information of the anchoring transaction record, and the like.

Continuously, a method of verifying shared information on a sharee's side will be described with reference to FIG. 8.

In operation S110, the sharee terminal 320 acquires the public key of the sharer which has been previously registered in the second blockchain network 220. When the public key has been registered in another public blockchain network, another server, or the like, the sharee terminal 320 may acquire the public key from the corresponding blockchain network or server.

In operations S120 to S140, the sharee terminal 320 retrieves the anchoring transaction record recorded in the second blockchain. As a retrieval result, anchoring information included in the anchoring transaction record may be acquired. As shown in FIG. 8, the anchoring information may include the shared information, the electronic signature information of the shared information, the block information of a transaction record recorded in the first blockchain, the TxID, and the like.

In operation S150, the sharee terminal 320 may verify the electronic signature information using the public key acquired in operation S110. When the electronic signature is determined to be valid, it is verified that the shared information has been shared by the sharer.

For reference, operation S150 may not be performed by the sharee terminal 320 but may be performed by the API server 330. For example, the API server 300 may previously acquire the public key of the sharer from the sharee terminal 320 or the second blockchain network 220. Also, when the anchoring information is acquired through operation S130, the API server 330 may operate to directly verify the anchoring information. In this case, the API server 330 may provide the anchoring information as well as a verification result of the electronic signature to the sharee terminal 320 or may provide the anchoring information to the sharee terminal 320 only when the electronic signature is determined to be valid.

Thus far, the method of sharing and verifying information on the basis of anchoring according to the first exemplary embodiment of the present disclosure has been described with reference to FIGS. 7 and 8. According to the above-described method, it is possible to ensure the integrity and reliability of shared information through a private key of a sharer.

FIGS. 9 to 12 are exemplary diagrams illustrating a method of sharing and verifying information on the basis of anchoring according to a second exemplary embodiment of the present disclosure. The second exemplary embodiment relates to a method of utilizing a hash value of unshared information extracted from a Merkle tree as verification information.

For convenience of description, the structure of a Merkle tree will be briefly described with reference to FIG. 9.

In a Merkle tree 30 which may be consulted in some exemplary embodiments of the present disclosure, leaf nodes correspond to hash values of each field information 20 constituting a transaction record. The number of fields may vary according to embodiments without limit.

Figure 9:
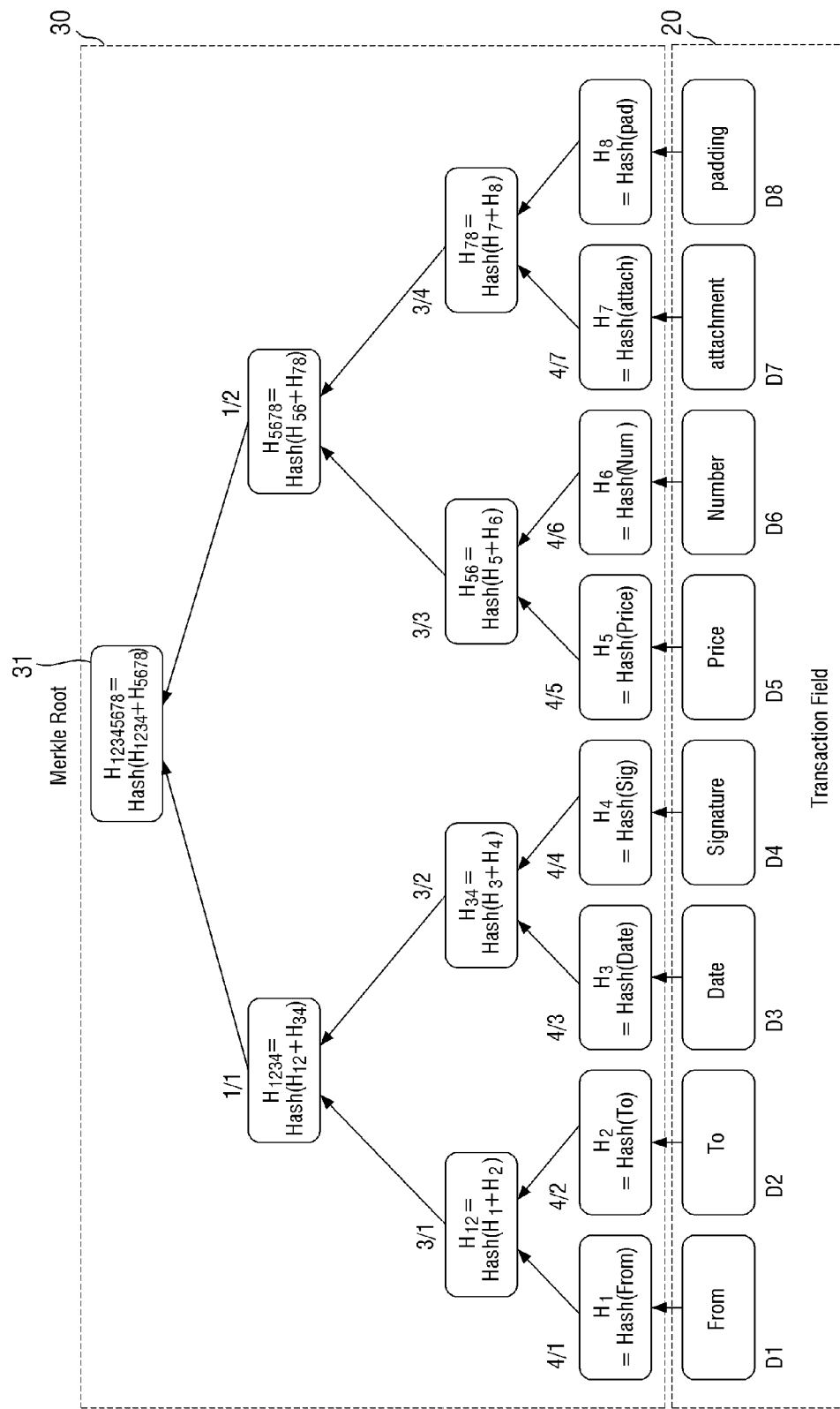
FIGS. 9 to 12 are diagrams illustrating a method of sharing and verifying information on the basis of anchoring according to a second exemplary embodiment of the present disclosure.

As shown in FIG. 9, a hash value 31 of a Merkle root (hereinafter "root hash value") may be calculated on the basis of the hash values of leaf nodes. This is apparent to those of ordinary skill in the art, and further description thereof will be omitted.

Figure 10:
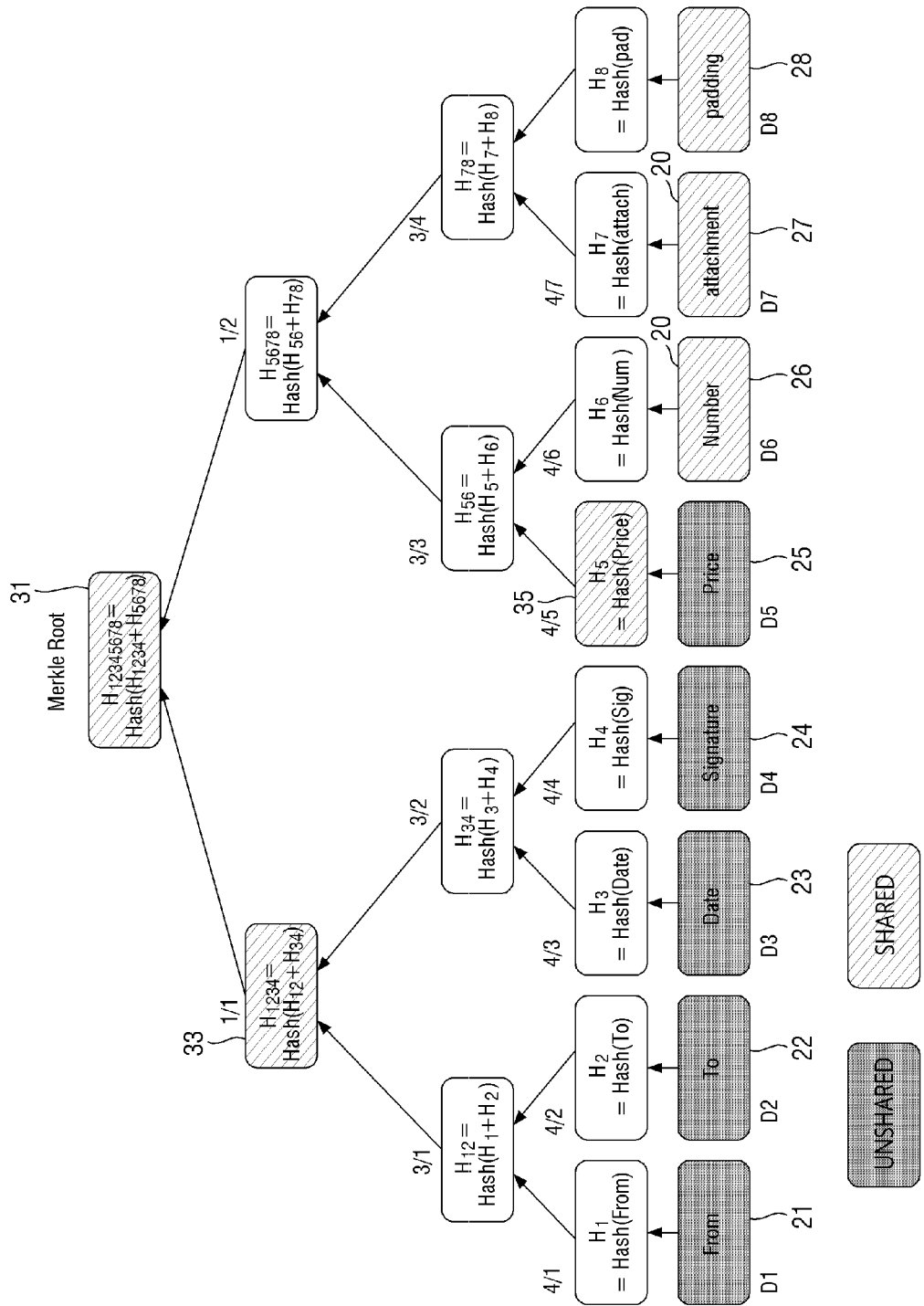
Figure 11:
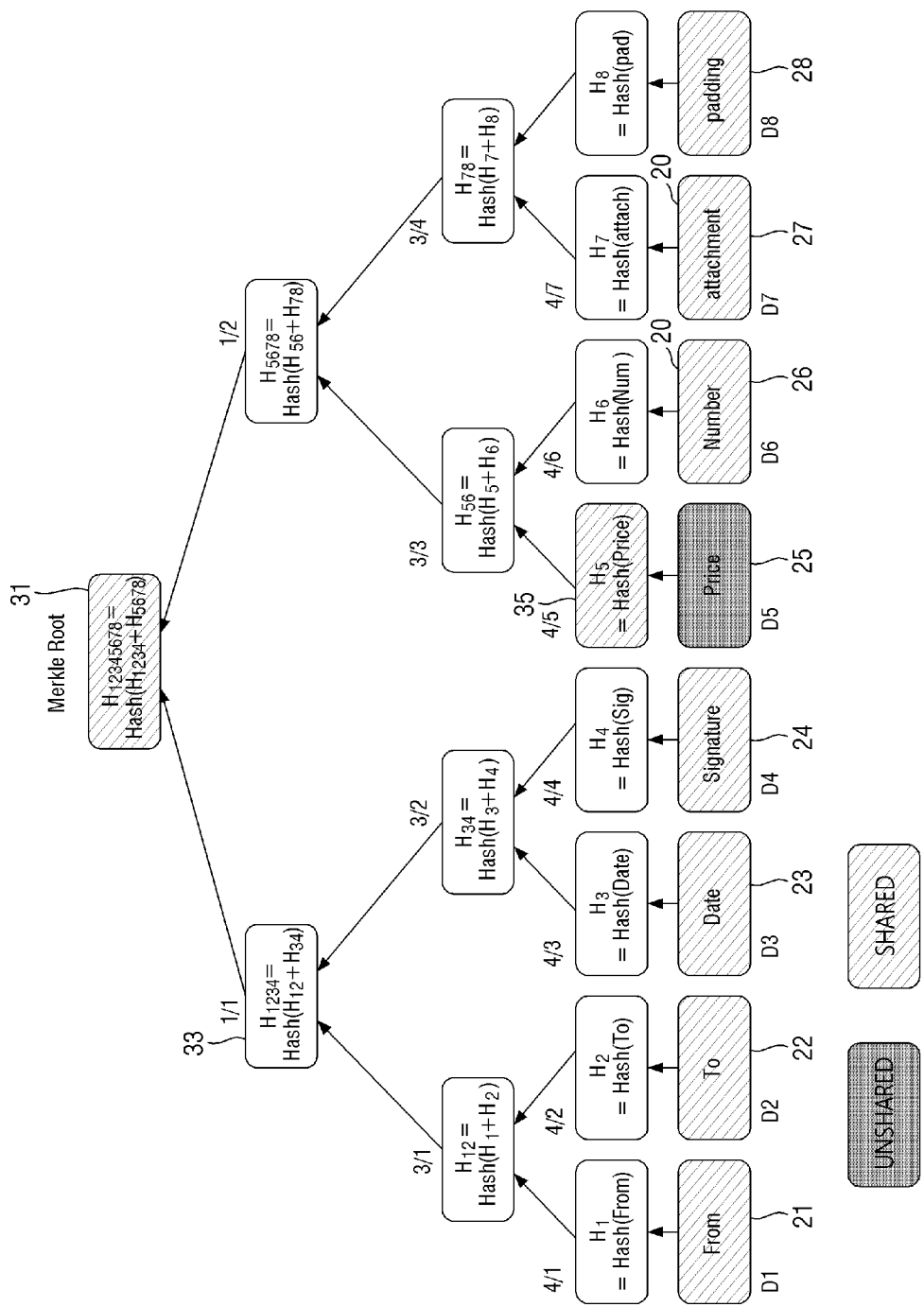

In the Merkle tree shown in FIGS. 9 to 11, a number (e.g., 1/1) shown adjacent to each node represents location information of the corresponding node. For example, "1/1" represents that the corresponding node has an index of "1" (i.e., the first node) at a depth (or level) of "1." However, this way of representation is only to facilitate understanding, and location information of tree nodes may be represented in various ways.

It is to be noted that the Merkle tree shown in FIGS. 9 to 11 is merely an example for facilitating understanding. A Merkle tree that can be used in various embodiments of the present disclosure is not necessarily configured as a binary tree as shown in FIGS. 9 to 11. Also, leaf nodes and field information do not necessarily correspond to each other on a one-to-one basis, and the relationship may be modified variously according to embodiments.

FIG. 10 shows an example of selectively sharing only some field information using a Merkle tree. In particular, FIG. 10 shows a case of excluding some pieces of field information 21 to 25 including price from a transaction record and sharing only some other pieces of field information 26 to 28.

In FIGS. 10 and 11, the pieces of field information 21 to 25 shown in a first shade represent unshared information which is not shared with a sharee. Therefore, the pieces of field information 21 to 25 shown in the first shade are excluded from anchoring information.

The pieces of field information 26 to 28 and hash values 31, 33, and 35 of the Merkle tree shown in a second shade represent information included in anchoring information. Specifically, the pieces of field information 26 to 28 are included in the anchoring information as shared information, and the hash values 31, 33, and 35 of the Merkle tree are included in the anchoring information for the purpose of verifying the shared information.

More specifically, the anchoring information may include the pieces of field information 26 to 28, location information (e.g., index values of leaf nodes) of the pieces of field information 26 to 28 in the Merkle tree, the Merkle hash values 31, 33, and 35, and location information (e.g., depth and index values) of the Merkle hash values 31, 33, and 35 in the Merkle tree.

As shown in FIG. 10, the hash values 31, 33, and 35 of the Merkle tree 30 which are anchored as verification information may include the root hash value 31 and the minimum number of non-root hash values 33 and 35 required to calculate the root hash value 31. In this way, it is possible to reduce network cost and computing cost required for anchoring.

In this case, the non-root hash values 33 and 35 are hash values related to the pieces of unshared information 21 to 25. A hash value related to first field information (e.g., 21) may include a first hash value (e.g., $H_1$) of the first field information located at a first leaf node of the Merkle tree and a hash value of a parent node of the first leaf node (i.e., hash values (e.g., $H_{12}$, $H_{1234}$, and $H_{12345678}$) calculated on the basis of the first hash value (e.g., $H_1$)).

However, according to another embodiment of the present disclosure, a hash value of the Merkle tree 30 anchored as verification information may include the minimum number of non-root hash values or more.

FIG. 11 shows another example of selectively sharing only some field information using a Merkle tree. In particular, FIG. 11 shows a case of sharing the transaction record excluding only price information 25.

In the example shown in FIG. 11, an anchored hash value of the Merkle tree 30 may include the root hash value 31 and the non-root hash value 35 of the unshared information 25. This is because as long as there is the non-root hash value 35, it is possible to calculate the root hash value 31 through hash values of the pieces of shared information 21 to 24 and 26 to 28.

Figure 12:
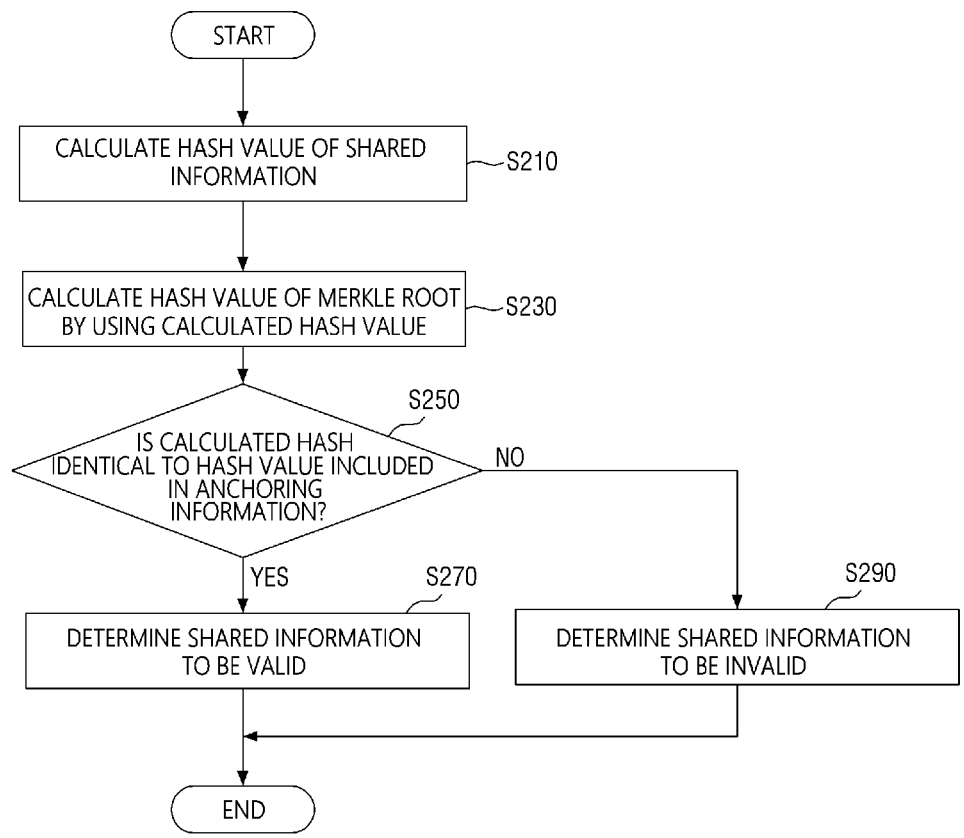

FIG. 12 is an exemplary flowchart showing a method of verifying shared information by using an anchored hash value of a Merkle root. The verification method may be performed by a computing device (e.g., 320 or 330) on a sharee's side.

As shown in FIG. 12, the verification method begins with operation S210 of calculating a hash value of shared information. For example, when the pieces of shared information 26 to 28, the root hash value 31, and the non-root hash value 35 shown in FIG. 10 are acquired from anchoring information, hash values of the shared information 26 to 28 may be calculated in this operation S210.

In operation S230, the hash value of a Merkle root is calculated. Specifically, a root hash value may be calculated by repeating a hash operation on the basis of the hash value calculated in operation S210 and a non-root hash value included in anchoring information. The process of calculating the hash value of a Merkle root has been described above with reference to FIGS. 9 to 11.

In operation S250, the calculated hash value is compared with a hash value included in the anchoring information.

When it is determined as the comparison result that the two hash values are identical, the shared information may be determined to be valid (S270). Otherwise, the shared information may be determined to be invalid (S290).

Thus far, the method of sharing and verifying information on the basis of anchoring according to the second exemplary embodiment of the present disclosure has been described with reference to FIGS. 9 to 12. According to the above-described method, it is possible to ensure the integrity and reliability of shared information through a hash value of a Merkle tree. Also, computing cost and network cost required for anchoring may be minimized by anchoring the minimum number of hash values.

Figure 13:
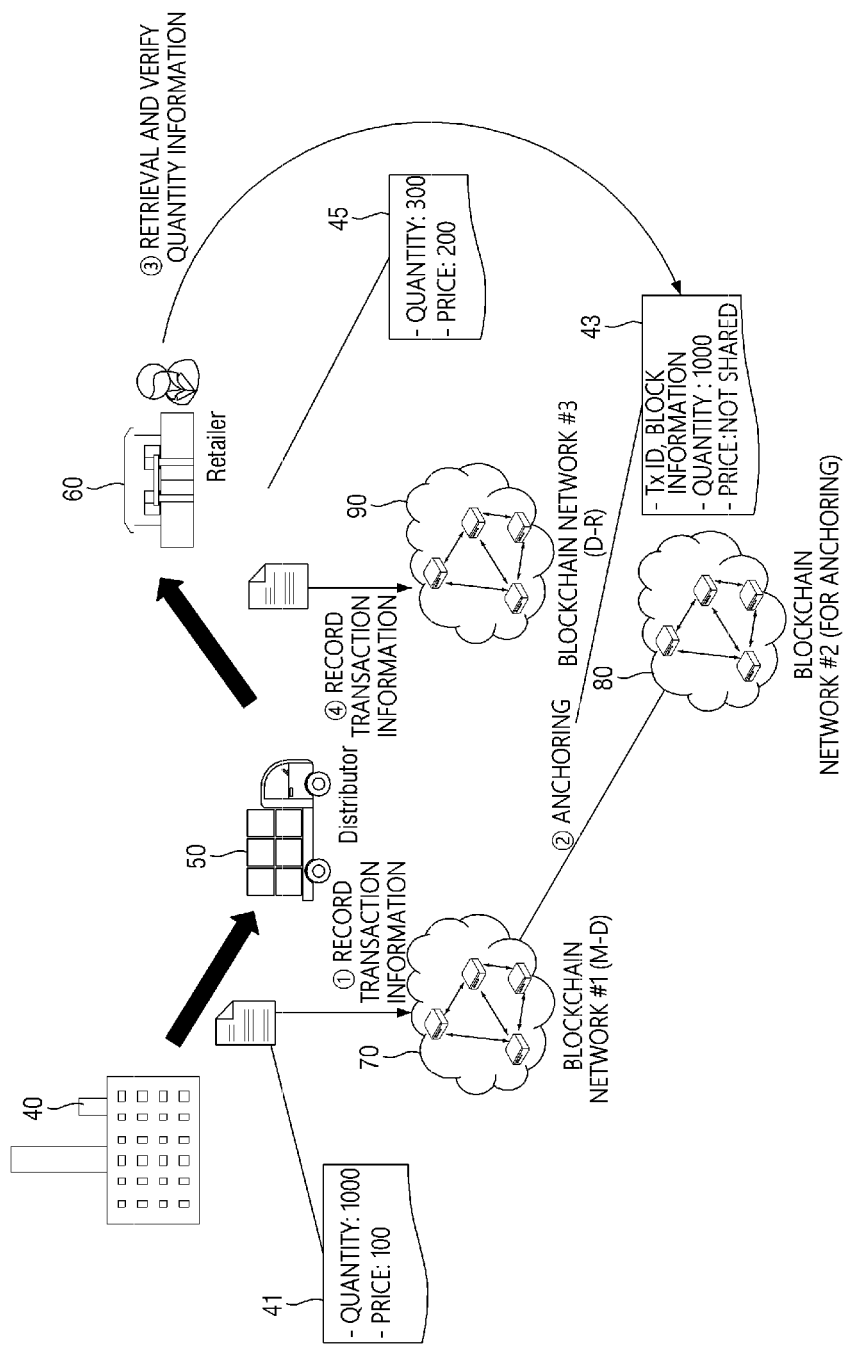
FIG. 13 is a diagram illustrating a system and method for sharing information on the basis of anchoring according to an application example of the present disclosure.

A system and method for sharing information on the basis of anchoring according to an application example of the present disclosure will be described below with reference to FIG. 13. In particular, FIG. 13 shows the technical spirit of the present disclosure used in the SCM field as an example. FIG. 13 will be described below.

As shown in FIG. 13, it is assumed that logistics transactions are done among a manufacturer 40, a distributor 50, and a retailer 60. Also, the distributor 50 is assumed to want to tell the retailer 60 that a supply is secured but want to hide the purchase amount of the supply from the retailer 60. In this case, the needs of the distributor 50 may be satisfied by selectively anchoring only supply information among pieces of transaction information according to the above-described exemplary embodiment of the present disclosure.

Specifically, when a logistics transaction is done between the manufacturer 40 and the distributor 50, transaction information 41 is recorded in a first blockchain which is shared through a first blockchain network 70 (1). The first blockchain is a blockchain to which access of the retailer 60 is not allowed.

Subsequently, the transaction information 41 between the manufacturer 40 and the distributor 50 is recorded in a second blockchain, which is shared through a second blockchain network 80, through anchoring (2). The second blockchain is a blockchain to which access of the retailer 60 is allowed.

At this time, in anchoring information 43 recorded in the second blockchain, supply information that the distributor 50 wants to share is included, but price information is not. Also, the anchoring information 43 may include the block number of a transaction record of the transaction information 41 and a TxID and further include verification information for the supply information.

As described above, the verification information may be electronic signature information and/or a hash value of a Merkle tree.

Subsequently, the retailer 60 may acquire the anchoring information 43 from the second blockchain and verify the supply information (3). When the supply information is verified to be valid, the retailer 60 may make sure that distributor 50 has secured the supply and do a logistics transaction with the distributor 50. In this case, transaction information between the retailer 60 and the distributor 50 may be recorded in a third blockchain shared through a third blockchain network 90 (4).

Meanwhile, the manufacturer 40 may want to check whether the distributor 50 has enough capital before doing a logistics transaction with the distributor 50. For example, the manufacturer 40 may want to check previous transaction information (a supply and the amount of money) between the distributor 50 and the retailer 60, but the third blockchain may be a blockchain to which access of the distributor 50 is restricted.

In this case, transaction information (a supply and the amount of money) between the distributor 50 and the retailer 60 may also be anchored to the second blockchain. Then, the manufacturer 40 may acquire the anchored information from the second blockchain and check and verify the transaction information between the distributor 50 and the retailer 60. Also, the manufacturer 40 may do a logistics transaction with the distributor 50 on the basis of the verification result.

Thus far, the anchoring-based information sharing method used in the SCM field according to an application example of the present disclosure has been described with reference to FIG. 13. However, the technical spirit of the present disclosure may be used in various fields without limit in addition to the application example.

FIG. 14 is a block diagram showing a hardware configuration of an exemplary computing device 400 for implementing a device (e.g., the anchoring device 100) according to various exemplary embodiments of the present disclosure.

Referring to FIG. 14, the computing device 400 may include at least one processor 410, a bus 450, a communication interface 470, a memory 430 to which a computer program 491 executed by the processor 410 is loaded, and a storage 490 which stores the computer program 491. However, FIG. 14 shows only elements related to embodiments of the present disclosure. Therefore, those of ordinary skill in the art will see that general elements other than those shown in FIG. 14 may be further included.

The processor 410 controls overall operation of each element of the computing device 400. The processor 410 may be configured to include a central processing unit (CPU), a microprocessor unit (MPU), a microcontroller unit (MCU), a graphics processing unit (GPU), or any form of processor well known in the technical field of the present disclosure. The processor 410 may perform calculation for at least one application or program for executing methods according to embodiments of the present disclosure. The computing device 400 may include one or more processors.

The memory 430 stores various kinds of data, commands, and/or information. To execute an anchoring-based information sharing method according to embodiments of the present disclosure, the memory 430 may load one or more programs 491 from the storage 490. The memory 430 may be implemented as a volatile memory such as a random access memory (RAM), but the technical scope of the present disclosure is not limited thereto.

The bus 450 provides a communication function between elements of the computing device 400. The bus 450 may be implemented as various forms of buses, such as an address bus, a data bus, and a control bus.

The communication interface 470 supports wired and wireless Internet communication of the computing device 400. Also, the communication interface 470 may support various communication methods as well as Internet communication. To this end, the communication interface 470 may include a communication module well known in the technical field of the present disclosure.

The storage 490 may non-temporarily store the one or more programs 491. The storage 490 may include a non-volatile memory, such as a read only memory (ROM), an erasable programmable ROM (EPROM), an electrically erasable programmable ROM (EEPROM), and a flash memory, a hard disk, a removable disk, or any form of computer-readable recording medium well known in the technical field to which the present disclosure pertains.

The computer program 491 may include one or more instructions which cause the processor 410 to perform methods according to various embodiments of the present disclosure when loaded to the memory 430. In other words, the processor 410 may perform methods according to various embodiments of the present disclosure by executing the one or more instructions.

As an example, the computer program 491 may include instructions to perform an operation of acquiring anchoring information including first field information permitted for sharing from a target transaction record recorded in a blockchain of a sharer and an operation of recording the acquired anchoring information in a blockchain for anchoring. In this case, the anchoring device 100 may be implemented through the computing device 400.

As another example, the computer program 491 may include instructions to perform an operation of retrieving an anchoring transaction record, which includes first field information and second field information for verifying the first field information, recorded in a blockchain for anchoring and an operation of verifying the first field information by using the second field information. The first field information indicates field information permitted for sharing in the target transaction record. In this case, the sharee terminal 320 or the API server 330 on the sharee's side may be implemented through the computing device 400.

Thus far, the exemplary computing device 400 for implementing a device (e.g., the anchoring device 100) according to various exemplary embodiments of the present disclosure has been described with reference to FIG. 14.

Various exemplary embodiments of the present disclosure and effects thereof have been described above with reference to FIGS. 1 to 14. Effects of the present disclosure are not limited to those mentioned above, and other effects which have not been mentioned will be clearly understood by those of ordinary skill in the art from the above description.

The concepts of the present disclosure described above with reference to FIGS. 1 to 14 can be embodied into computer-readable code on a computer-readable recording medium. The computer-readable recording medium may be, for example, a portable recording medium (a compact disk (CD), a digital versatile disk (DVD), a Blu-ray disk, a universal serial bus (USB) storage device, or a removable hard disk) or a fixed recording medium (a ROM, a RAM, or a computer-embedded hard disk). A computer program recorded in the computer-readable recording medium may be transmitted to another computing device through a network, such as the Internet, and installed in the computing device so that the computer program may be used in the computing device.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. A method performed by an anchoring device to share information on the basis of anchoring, the method comprising:

acquiring anchoring information from a target transaction record recorded in a first blockchain; and recording the acquired anchoring information in a second blockchain, wherein the target transaction record includes a plurality of pieces of field information including first field information permitted for sharing and second field information not permitted for sharing;

the anchoring information includes the first field information and verification information, and the anchoring information excludes the second field information;

the verification information includes information for verifying on the first field information and the second field information; and the information for verifying the first field information and the second field information includes a root hash value of a Merkle tree configured on the basis of the plurality of pieces of field information and a non-root hash value related to the second field information in the Merkle tree.

2. The method of claim 1, wherein the first blockchain is a blockchain to which access of a sharee of the first field information is restricted; and the second blockchain is a blockchain to which access of a sharee of the first field information is allowed.

3. The method of claim 2, wherein the first blockchain is a private blockchain; and the second blockchain is a public blockchain.

4. The method of claim 2, wherein the first blockchain is shared through a first channel in a blockchain network; and the second blockchain is shared through a second channel in the blockchain network.

5. The method of claim 1, wherein the anchoring information further includes an identifier of a target transaction and information on a block in which the target transaction record is recorded.

6. The method of claim 1, wherein the anchoring information further includes electronic signature information of the first field information generated with a private key related to a target transaction.

7. The method of claim 6, wherein a public key corresponding to the private key is registered in a specific blockchain which is a public blockchain.

8. The method of claim 1, wherein the non-root hash value related to the second field information includes a minimum number of non-root hash values required for calculating the root hash value.

9. A method performed by a computing device to share information on the basis of anchoring, the method comprising:

retrieving an anchoring transaction record recorded in a first blockchain, the anchoring transaction record including first field information and verification information; and verifying the first field information by using the verification information, wherein the anchoring transaction record is generated by anchoring a target transaction record recorded in a second blockchain;

the target transaction record includes a plurality of pieces of field information including the first field information permitted for sharing and second field information not permitted for sharing wherein the verification information includes information for verifying the first field information and the second field information; and the information for verifying the first field information and the second field information includes a root hash value of a Merkle tree configured on the basis of the plurality of pieces of field information and a non-root hash value related to the second field information in the Merkle tree.

10. The method of claim 9, wherein the first field information corresponds to some of the plurality of pieces of field information included in the target transaction record.

11. The method of claim 9, wherein the first blockchain is a public blockchain; and the second blockchain is a private blockchain.

12. The method of claim 9, wherein the verification information further includes electronic signature information of the first field information; and the verifying of the first field information comprises:

acquiring a public key previously registered in a public blockchain; and verifying the electronic signature information with the acquired public key.

13. The method of claim 9, wherein the information for verifying the first field information and the second field information includes a first root hash value of a Merkle tree configured on the basis of the plurality of pieces of field information and a non-root hash value related to the second field information in the Merkle tree; and the verifying of the first field information comprises:

calculating a hash value of the first field information;

calculating a second root hash value of the Merkle tree by using the calculated hash value and the non-root hash value; and verifying the first field information on the basis of a comparison result between the first root hash value and the second root hash value.

14. The method of claim 13, wherein the non-root hash value related to the second field information includes a minimum number of non-root hash values required for calculating the second root hash value.

15. An anchoring device comprising:

a communication interface configured to interoperate with a first blockchain and a second blockchain;

a memory including one or more instructions; and a processor configured to, by executing the one or more instructions, acquire anchoring information from a target transaction record recorded in the first blockchain, and record the acquired anchoring information in the second blockchain, wherein the target transaction record includes a plurality of pieces of field information including first field information permitted for sharing and second field information not permitted for sharing;

the anchoring information includes the first field information and verification information, and the anchoring information excludes the second field information; and the verification information includes information for verifying on the first field information and the second field information; and the verification information includes a root hash value of a Merkle tree configured on the basis of the plurality of pieces of field information and a non-root hash value related to the second field information in the Merkle tree.

16. The anchoring device of claim 15, wherein the anchoring information further includes electronic signature information of the first field information generated with a private key related to a target transaction.

\* \* \* \* \*